No. 683,267. Patented Sept. 24, 1901.
H. B. FROEHLICH.
EDUCATIONAL MEDIUM.
(Application filed June 8, 1900.)

(No Model.)

Fig 1. $X$ $A$ $A^1$ $A^2$ AERONAUT

Fig 2. $B$ $B^1$ $X^1$ $B^2$ $B^3$ PENNSYLVANIA

Fig 3. $C$ $X^2$ $C^1$ EGYPTIAN

Fig 4. $D$ $D^1$ $D^2$ COLONELSHIP $Y$ $H$ $Y^1$ $H^1$ $Y^2$ $H^2$

Fig 5. $E$ $E^1$ $E^2$ SOVEREIGN $I$ $Z$ $I^1$ $Z^1$ $I^2$ $Z^2$

Fig 6. $F$ $X^3$ $F^1$ $F^2$ APPRECIATE $G$ $J$ $G^1$ $G^2$

WITNESSES: INVENTOR
Theodore A. Froehlich. Helen B. Froehlich.
John H. Hayes

UNITED STATES PATENT OFFICE.

HELEN B. FROEHLICH, OF NEW YORK, N. Y.

EDUCATIONAL MEDIUM.

SPECIFICATION forming part of Letters Patent No. 683,267, dated September 24, 1901.

Application filed June 8, 1900. Serial No. 19,575. (No model.)

*To all whom it may concern:*

Be it known that I, HELEN B. FROEHLICH, a citizen of the United States, and a resident of the city of New York, borough of Manhattan, in the county and State of New York, have invented certain new and useful Improvements in Educational Mediums, of which the following is a full, clear, and exact description.

The invention relates to educational appliances; and its object is to provide certain new and useful improvements in educational mediums whereby words as they appear in books, charts, tablets, cards, leaflets, and like educational mediums appeal strikingly to the eye of the student to facilitate and simplify the study and teaching of spelling and reading and the pronunciation of words.

The invention consists, essentially, in an educational medium—such as a book, card, chart, or the like—having the syllables of a word appearing in contrasting colors.

Reference is to be had to the accompanying drawings, forming a part of this specification, in which similar characters of reference indicate corresponding parts in all the views.

Figure 1 represents a word syllabified in accordance with my improvement, as many different colors being applied as there are syllables in a word. Fig. 2 shows a word syllabified according to my improvement, the several syllables of the word appearing in three distinct colors. Figs. 3, 4, and 5 show words syllabified by having two different colors applied alternately, and Fig. 6 illustrates a word syllabified by means of different colors placed in close proximity to the corresponding syllables.

In the syllabification of words according to my improvement two or more colors are used to separate and define each syllable in a word, the colors selected for the purpose being preferably bright and contrasting, as many colors, however, being selected as there are syllables in the word and as many distinct colors being employed as there are unaccented syllables in the word; but for the accented syllables I use a neutral color or, preferably, black. A neutral color or black may be used to represent the accented syllables in a word, while contiguous unaccented syllables are represented by two other colors legible and contrasting and used alternately.

In the following detailed description I use the term "syllable" as employing all the letters comprising it.

In Fig. 1 the four syllables of the word "aeronaut" are indicated by A A' A² in four colors, preferably a neutral color or black for the syllable X and the colors red, green, and yellow for the syllables A A' A², respectively. It is evident that by the use of the legible and contrasting colors employed each syllable is strikingly distinguished from its contiguous syllable, so that a student can more readily memorize and properly spell, read, and pronounce the word.

In the word "Pennsylvania" (shown in Fig. 2) the unaccented syllables B B² appear preferably in red, while the remaining unaccented syllables B' B³ are colored green and the accented syllable X' is colored black. The shade of color used for the accented syllable is selected heavier or lighter according to the corresponding accent to be given to the syllable. By employing red and green alternately and a third neutral color or black to represent the accented syllable a very effective separation of the several syllables is obtained to sharply define the syllables without separating the same or using special marks, as heretofore practiced.

In Fig. 3 the unaccented syllables C C' of the word "Egyptian" appear in the same color, preferably red, said syllables being separated by the accented syllable X² in a neutral color or black.

In the word "colonelship" (shown in Fig. 4) the final letters H H' H² of the syllables D D' D² appear in a legible and contrasting color, preferably red, while the remaining letters Y Y' Y² of said syllables appear in a neutral color or black. By the arrangement described not only the syllables appear distinct, but also the end of each syllable is sharply defined.

As shown in Fig. 5, the initial letters I I' I² of the syllables E E' E² in the word "sovereign" appear in contrasting color, preferably red, and the remaining letters Z Z' Z² of said syllables appear in a neutral color or black, so that not only the syllables appear distinct from one another, but also the beginning of each syllable is strikingly marked.

In Fig. 6 the word "appreciate" appears printed in black, and the syllables F, X³, F', and F² are defined by colored lines G, J, G', and G², placed in close proximity to the several syllables, preferably beneath the same. The lines are bright, and contrastingly-colored lines are under the unaccented syllables F F' F², while the line J under the accented syllable X³ is preferably of a neutral color or black.

From the foregoing it is evident that the syllables in a word are not separated, as heretofore practiced, but appear distinct to the eye of the student, owing to the different colors employed.

The value of books, charts, and other educational mediums produced according to my invention is much enhanced by the application of the color features, as they represent difficult and long words as unbroken wholes, and at the same time they are presented in parts that stand out distinctly as individual small wholes that appeal strikingly to the eye.

Having thus fully described my invention, I claim as new and desire to secure by Letters Patent—

1. As a new article of manufacture, an educational medium such as a book, chart, card or the like used for studying and teaching the syllabification of words, and having words thereon visually syllabicated by color, as set forth.

2. As a new article of manufacture, an educational medium used for teaching the syllabification of words, and having thereon words, the syllables of which appear in contrasting colors, as set forth.

3. As a new article of manufacture, an educational medium used for teaching the syllabification of words and having words thereon, the contiguous syllables of a word appearing in different colors, as set forth.

4. As a new article of manufacture, an educational medium used for teaching the syllabification of words and having words thereon, the contiguous syllables of a word appearing in different colors, the unaccented syllables being in colors other than black, and the accented syllables being of a neutral color or black, as set forth.

HELEN B. FROEHLICH.

Witnesses:
THEODORE A. FROEHLICH,
JOHN HAYES.